(12) United States Patent
Tsukui et al.

(10) Patent No.: US 8,469,434 B2
(45) Date of Patent: Jun. 25, 2013

(54) FRONT STRUCTURE FOR SADDLE-TYPE VEHICLE

(75) Inventors: Hiroaki Tsukui, Saitama (JP); Yoshitaka Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/283,913

(22) Filed: Oct. 28, 2011

(65) Prior Publication Data

US 2012/0104787 A1 May 3, 2012

(30) Foreign Application Priority Data

Oct. 29, 2010 (JP) ................................. 2010-244246

(51) Int. Cl.
*B62J 17/04* (2006.01)

(52) U.S. Cl.
USPC ......................................... 296/78.1; 296/208

(58) Field of Classification Search
USPC ................................................. 296/78.1, 208
IPC ......................................................... B62J 17/04
See application file for complete search history.

(56) References Cited

U.S. PATENT DOCUMENTS 6,979,039 B2 * 12/2005 Takemura et al. ........... 296/78.1

FOREIGN PATENT DOCUMENTS

| EP | 1457412 A2 | 9/2004 |
| EP | 1495954 A2 | 1/2005 |
| EP | 1803633 A1 * | 7/2007 |
| JP | 7-52857 A | 2/1995 |
| JP | 2002-104267 A | 4/2002 |
| JP | 2006-143054 A | 6/2006 |
| JP | 2008-265625 A | 11/2008 |
| WO | WO 2008082357 A1 * | 7/2008 |

* cited by examiner

*Primary Examiner* — Dennis Pedder
*Assistant Examiner* — Beverly Becker
(74) *Attorney, Agent, or Firm* — Birch, Stewart, Kolasch & Birch, LLP

(57) ABSTRACT

In a saddle-type vehicle having a structure for guiding a flow of air toward the rear side of a screen, to provide a technology by which thermal influences on the rider can be alleviated. A screen stay is integrally provided at its lower portion with a bridge-like section spaced upward from a front cover, and has left and right connection sections extending in the vehicle width direction from the bridge-like section and connected to the side of a body frame at positions on outer sides relative to a fork member in the vehicle width direction. This ensures that the flow of air guided in via a flow of air guide section is permitted to flow between an upper edge of the front cover and the bridge-like section toward the vehicle rear side. A meter for indicating operating conditions of the vehicle is supported on the screen stay.

20 Claims, 14 Drawing Sheets

FRONT STRUCTURE FOR SADDLE-TYPE VEHICLE

CROSS-REFERENCE TO RELATED APPLICATIONS

The present application claims priority under 35 USC 119 to Japanese Patent Application No. 2010-244246 filed on Oct. 29, 2010 the entire contents of which are hereby incorporated by reference.

BACKGROUND OF THE INVENTION

1. Field of the Invention

The present invention relates to an improvement in a front structure of a saddle-type vehicle.

2. Description of Background Art

A front structure for a saddle-type vehicle is known wherein a through-hole for guiding a flow of air (a relative airflow generated during traveling of the vehicle) to the rear side of a windscreen for shielding the flow of air going toward the rider is provided between a body cover covering a front portion of the vehicle and the windscreen. See, for example, Japanese Patent Laid-Open No. 2006-143054 (FIG. 3).

As shown in FIG. 3 of Japanese Patent Laid-Open No. 2006-143054, through-holes (210L, 210R) (parenthesized numerals are reference symbols used in Japanese Patent Laid-Open No. 2006-143054, here and hereafter) are formed between the lower end of a windscreen (21) and a body cowl (20).

A flow of air (W) passes through the through-holes (210L, 210R) to flow to the back side of the windscreen (21) (hereafter referred to as "screen (21)"). Therefore, a negative pressure generated on the back side of the screen (21) is moderated, which makes it possible to lower the possibility for the flow of air (W) passing on the side of an upper end portion (21te) of the screen (21) to be engulfed to the rear side of the screen (21).

In the technology disclosed in Japanese Patent Laid-Open No. 2006-143054, however, the through-holes (210L, 210R) can only lower the possibility for the flow of air to be engulfed to the rear side of the screen (21). In the conventional structure, the through-holes (210L, 210R) are not provided in a central area of the vehicle body and are small in size, so that the guided wind cannot flow directly toward the rider. In addition, it is not taken into account to reduce the influence of hot air coming up from an engine on the rider, in an environment in which the hot air inevitably comes up from the engine, during operation of the vehicle.

SUMMARY AND OBJECTS OF THE INVENTION

It is an object of an embodiment of the present invention to provide a technology by which thermal influence on the rider can be alleviated, in a saddle-type vehicle having a structure for guiding a flow of air to the rear side of a screen.

According to an embodiment of the present invention, a front structure for a saddle-type vehicle (10) includes a fork member which is supported on a head pipe provided at a front portion of a body frame and by which a front wheel is rotatably borne. A front cover is disposed on an upper side of the fork member with a screen stay disposed on an upper side of the front cover to support the screen. A flow of air guide section is formed at a lower edge of the screen to guide a flow of air so that the flow of air flows to the back side of the screen. The screen stay is integrally provided at its lower portion with a bridge-like section spaced upward from the front cover with left and right connection sections extending in a vehicle width direction from the bridge-like section and connected to the side of the body frame at positions on outer sides relative to the fork member in the vehicle width direction. The flow of air guided in via the flow of air guide section is permitted to flow between an upper edge of the front cover and the bridge-like section toward a vehicle rear side.

According to an embodiment of the present invention, a meter for indicating operating conditions of the vehicle is supported on the screen stay.

According to an embodiment of the present invention, a front surface of the screen stay is formed along the shape of the screen, and the screen is provided, separately from the flow of air guide section and at such a part as to overlap with the screen stay, with an upper-side flow of air guide window for guiding the flow of air to the front surface of the screen stay.

According to an embodiment of the present invention, the front cover is provided at its front surface with a stepped part extending leftward and rightward along the vehicle width direction so as to separate water contained in the flow of air.

According to an embodiment of the present invention, the front cover is provided at a rear portion of its front surface with a recess recessed rearward in the vehicle front-rear direction.

According to an embodiment of the present invention, the bridge-like section is provided on the upper side of the front cover. The flow of air guided into the flow of air guide section flows between the front cover and the bridge-like section toward the vehicle rear side. Therefore, a negative-pressure condition on the back side of the screen is moderated or eliminated, so that the flow of air flowing near edges of the screen would not easily come around to the back side of the screen. As a result, disturbance of the flow of air is restrained.

In addition, the flow of air guided into the flow of air guide section flows toward the rider located on the vehicle rear side of the flow of air guide section.

Hitherto, even a structure designed to guide a flow of air to the rear side of a screen has not been designed taking into account a condition for causing the flow of air to flow toward the rider. In such a structure, the heat of the engine may be transferred to the rider, so that there is room for improvement in regard of comfortableness during operation of the vehicle.

In connection with this point, in the present invention, it is ensured that the flow of air guided in via the flow of air guide section flows between the upper edge of the front cover and the bridge-like section toward the vehicle rear side. Since the flow of air guided to the rear surface of the screen flows toward the rider, the rider can be cooled with this flow of air.

Therefore, according to an embodiment of the present invention, thermal influence on the rider can be alleviated, whereby comfort during operation of the vehicle can be enhanced.

Furthermore, the left and right connection sections extending in the vehicle width direction from the bridge-like section are provided, and the left and right connection sections are connected to the body frame side at positions on the outer sides relative to the fork members in the vehicle width direction. This ensures that the quantity of flow of air capable of being taken in to the rear side of the screen can be enlarged and the thermal influence on the rider can be alleviated to a greater extent, as compared with the case where the left and right connection sections are connected to the body frame side at positions on the inner side of the fork members in the vehicle width direction.

According to an embodiment of the present invention, the meter is supported on the screen stay. Thus, the screen stay not only supports the screen but also support the meter. Since the screen stay functions also as a support for the meter, an increase in the number of component parts can be suppressed.

According to an embodiment of the present invention, the rear surface of the screen is attached to the screen stay, and the screen is provided with the upper-side flow of air guide window at such a part so as to overlap with the screen stay in front view of the vehicle.

A portion of the flow of air entering between the screen stay and the screen flows through the upper-side flow of air guide window to the back side of the screen. Since the flow of air flows to the back side of the screen, a wing on the back surface constituting the rear surface of the screen can be prevented from occurring easily.

According to an embodiment of the present invention, the front surface of the front cover is provided with the stepped part extending leftward and rightward in the vehicle width direction. In the case where a flow of air containing water flows along the front surface of the front cover, the flow of air comes into contact with the stepped part, whereon a portion of the water contained in the flow of air is separated. Thus, a portion of the water is removed by the stepped part, which makes it possible to reduce the quantity of water contained in the flow of air flowing toward the vehicle rear side along the front surface of the front cover.

According to an embodiment of the present invention, the front cover is provided at a rear portion of its front surface with the recess recessed rearward in the vehicle front-rear direction. With such a recess provided at the rear portion of the front surface of the front cover, an exit for the flow of air guided to the back side of the screen can be enlarged, and a large quantity of the flow of air can be guided toward the rider.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
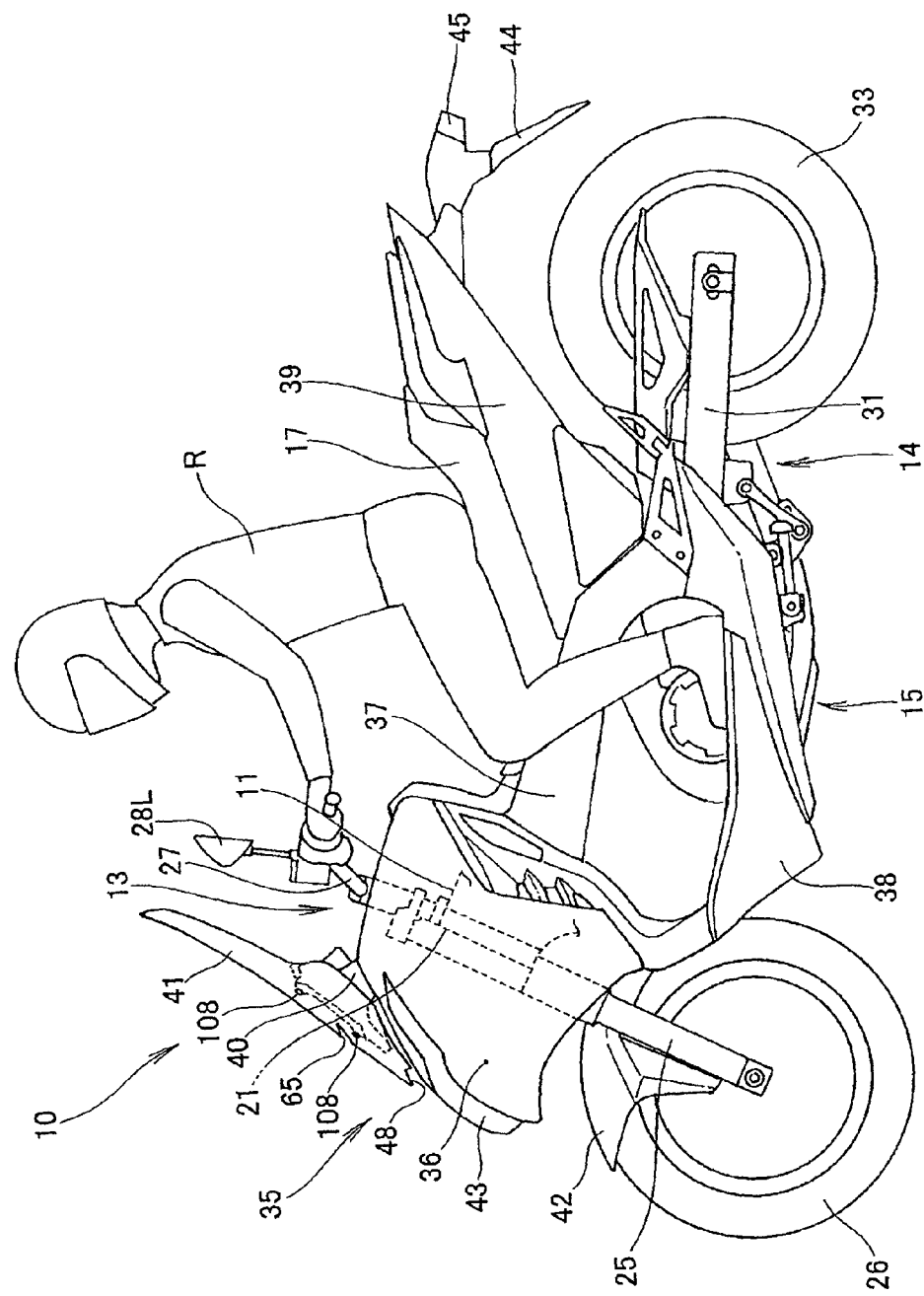
FIG. 1 is a left side view of a motorcycle according to the present invention.

An embodiment of the present invention will be described in detail below. In the drawings and in the example below, the terms "upper," "lower," "front," "rear," "left," and "right" are directions as viewed from the rider seated on the motorcycle. In addition, the drawings are to be viewed in accordance with the posture of reference symbols.

A working example of the present invention will be described, based on the drawings.

As shown in FIG. 1, a motorcycle 10 includes a body frame 11, a front wheel steering section 13 provided at a front portion of the body frame 11, a rear wheel suspension section 14 provided at a rear portion of the body frame 11, an engine 15 supported on the body frame 11 by bolt fastening, and a seat 17 on which the rider R is to be seated. The seat 17 is disposed on the upper side of the engine 15 and supported on the body frame 11. The Motorcycle is a saddle-type vehicle on which a rider is seated.

The front wheel steering section 13 is provided with fork members 25 steerably mounted to the body frame 11, a front wheel 26 borne on the lower ends of the fork members 25 in a rotatable and steerable manner, and a steering handle 27 mounted to the upper end of the fork member 25. Mirrors 28L and 28R (only reference symbol 28L on the viewer's side is shown) for checking the rear side are provided on the steering handle 27.

The rear wheel suspension section 14 is provided with a swing arm 31 extending from the body frame 11 toward the vehicle rear side, a rear shock absorber (not shown) provided bridgingly between the swing arm 31 and the body frame 11, and a rear wheel 33 rotatably borne on the rear end of the swing arm 31.

A cover member covering the vehicle will be described below.

The cover member 35 includes a front cover 36 provided at a front portion of the vehicle and covering the vehicle front portion, a side cover 37 extending toward the vehicle rear side while being continuous with the front cover 36, an under cover 38 including rider's steps provided on the lower side of the side cover 37, and a rear side cover 39 continuously extending toward the vehicle rear side from rear end portions of the side cover 38.

A screen stay 40 extends to the upper side of the front cover 36 with a screen 41 mounted to the screen stay 40.

On the upper side of the front wheel 26, a front fender 42 is mounted to the fork members 25. In addition, the front cover 36 is mounted to a head pipe 21, and a headlight 43 is attached to the front cover 36. A rear fender 44 is mounted to the body frame 11 on the upper side of the rear wheel 33, and a taillight 45 is provided at an upper portion of the rear fender 44.

A screen support structure provided at a vehicle front portion will be described below.

Figure 2:
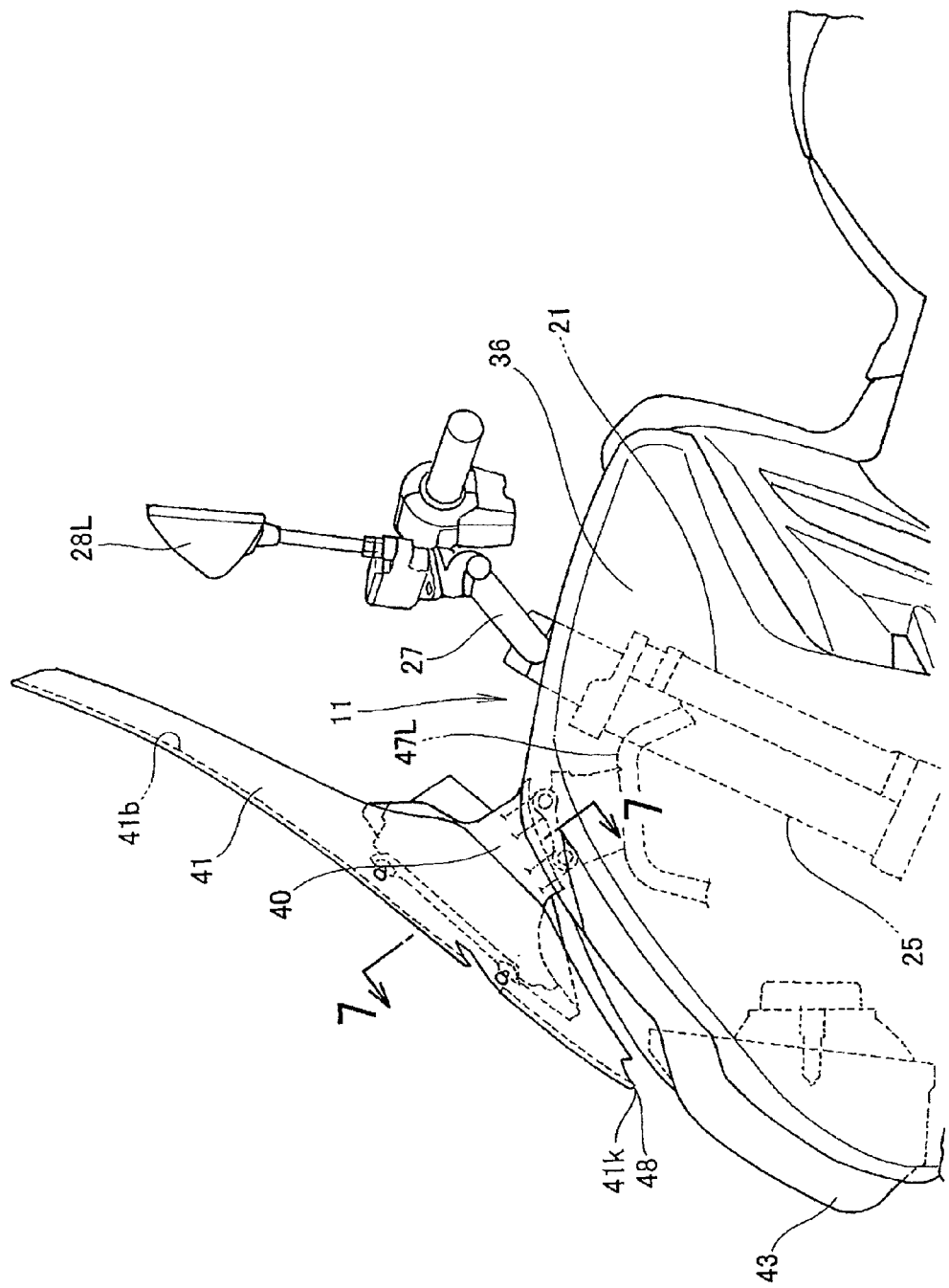
FIG. 2 is a left side view of a major part of the motorcycle.

As shown in FIG. 2, the head pipe 21 as a component element is provided at a front portion of the body frame 11. The fork members 25 are steerably supported on the head pipe 21.

Stay bases 47L and 47R (only reference symbol 47L on the viewer's side is shown) are tubular in form and support the front cover 36 and the screen 41. The stay bases 47L and 47R extend from the head pipe 21. The screen stay 40 supports the screen 41 mounted on the stay bases 47L, 47R. The screen stay 40 is disposed so as to extend to the upper side of the front cover 36 with the screen 41 being mounted to the screen stay 40. A flow of air guide section 48 for guiding a flow of air in so that the flow of air flows to the back side of the screen 41 is formed at a screen lower edge 41k.

The component elements of the screen stay for supporting the screen, etc. will be described below.

Figure 3:
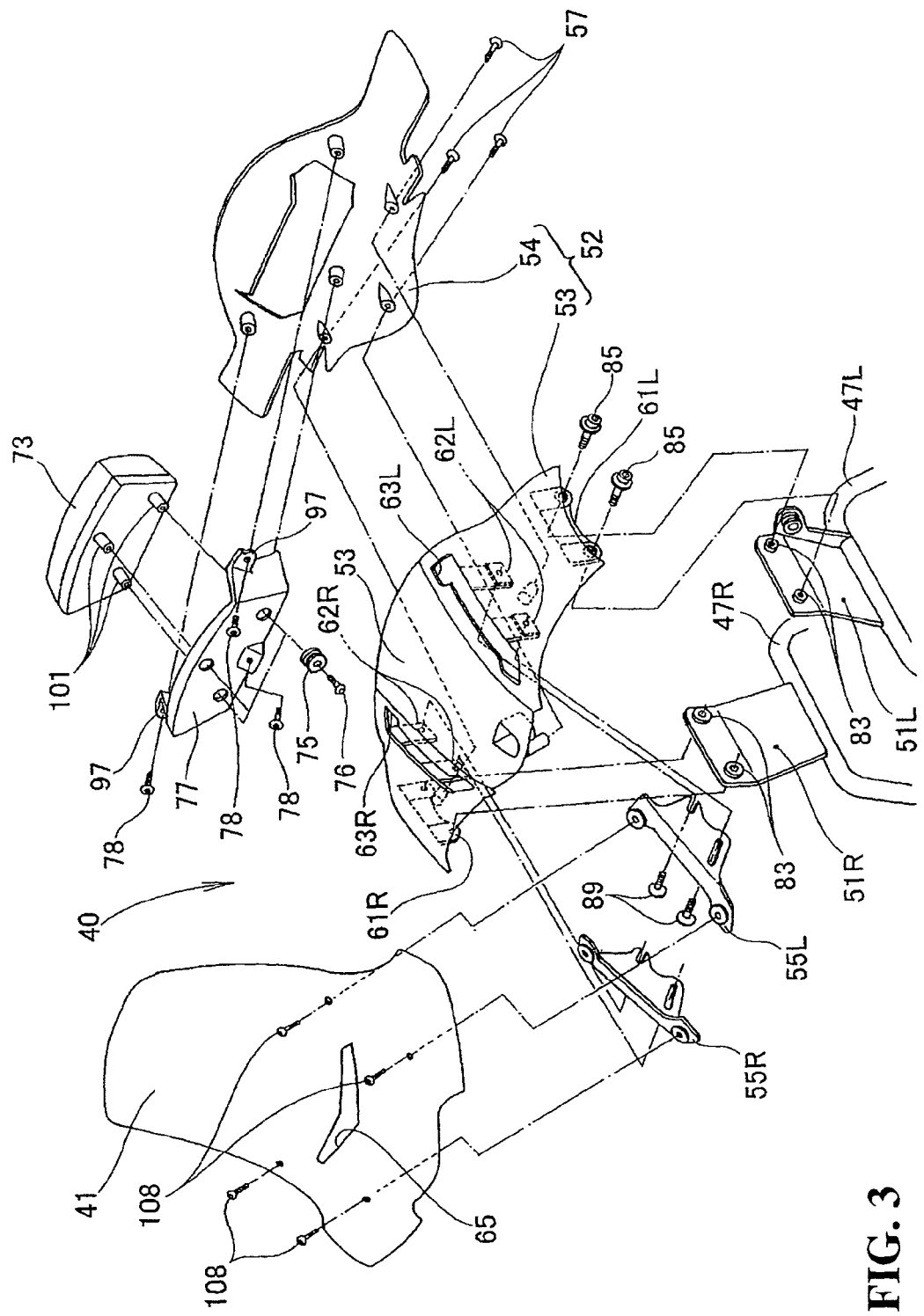
FIG. 3 is an exploded perspective view illustrating the structure of a screen stay and the surroundings thereof.

As shown in FIG. 3, left and right stay plates 51L and 51R extend upwardly from the stay bases 47L and 47R, and a screen stay upper half 53 is mounted to the left and right stay plates 51L, 51R. Left and right stay brackets 55L and 55R are attached to the screen stay upper half 53, and the screen 41 is mounted to the left and right stay brackets 55L, 55R.

The screen stay 40 is composed of a stay body 52, and the left and right stay brackets 55L and 55R extend upwardly from the stay body 52. The stay body 52 is composed of the above-mentioned screen stay upper half 53, and a screen stay lower half 54 abutted on the screen stay upper half 53 from the lower side of the screen stay upper half 53. The screen stay lower half 54 is attached to the screen stay upper half 53 through lower-half screws 57.

In this working example, the left and right stay plates 51L, 51R and the left and right stay brackets 55L, 55R are both made of metal, while the screen stay upper half 53 and the screen stay lower half 54 are both made of resin. However, this is not limitative, and they may be replaced by other arbitrary members. In addition, though the screen stay 40 includes a combination of a plurality of members, a part or the whole of the members may be integrated with one another by use of such a material as resin, for example.

Now, each part of the screen stay will be described below.

Figure 4:
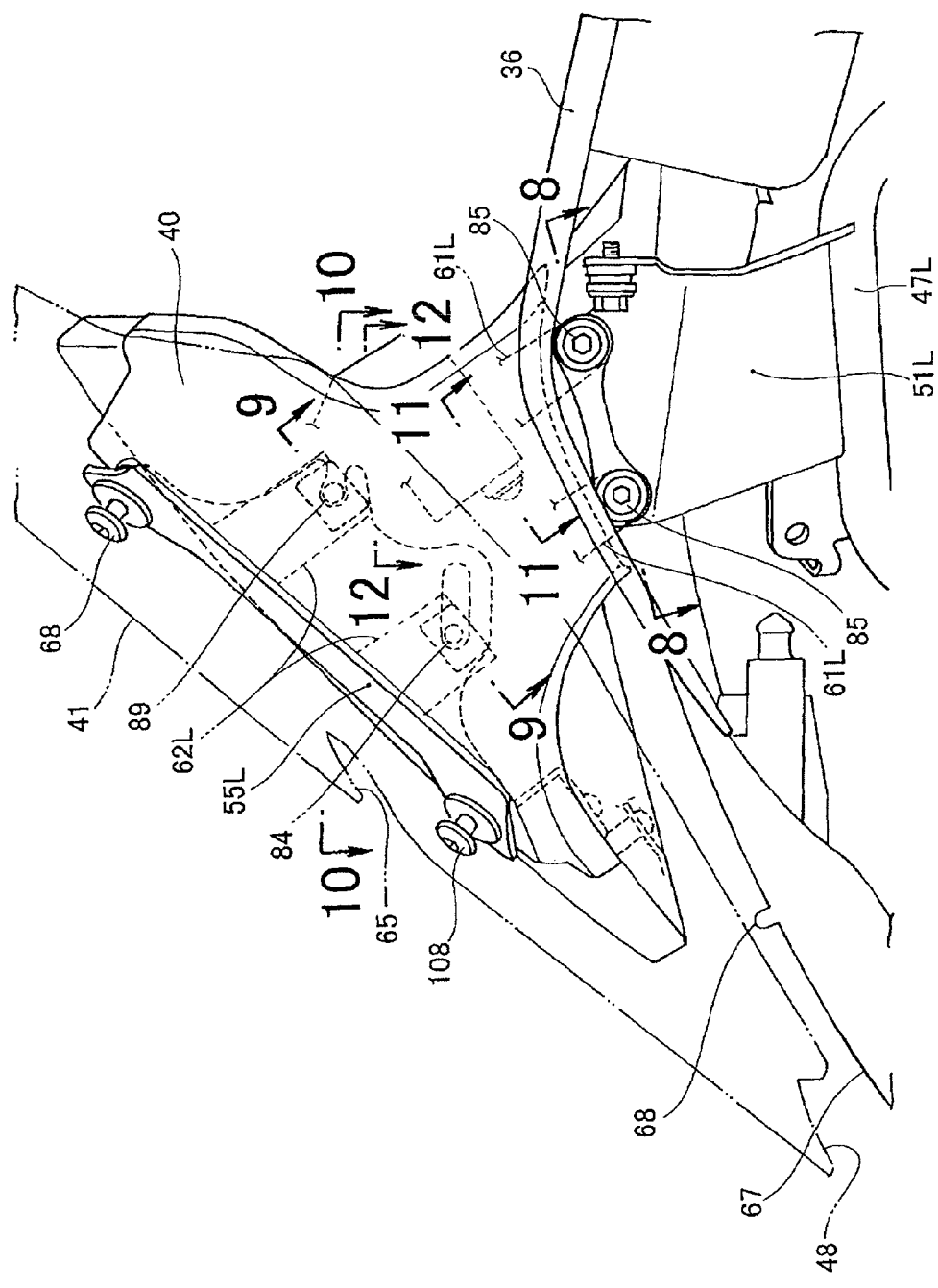
FIG. 4 is a side view illustrating component elements of the screen stay.

As shown in FIG. 4, the screen stay 40 extends to the upper side of the front cover 36 with the screen 41 being mounted to the screen stay 40.

Referring to FIG. 3 as well, left and right connection sections 61L and 61R to be mounted to the stay plates 51L and 51R extend downwardly from the screen stay upper half 53. In addition, left and right bracket support sections 62L and 62R for respectively supporting the left and right stay brackets 55L and 55R extend downwardly from the screen stay upper half 53, at positions on the inner sides of the left and right connection sections 61L and 61R in the vehicle width direction.

Left and right bracket openings 63L and 63R through which the stay brackets 55L and 55R can be passed are bored at positions on the inner sides of the left and right bracket support sections 62L and 62R provided on the screen stay upper half 53.

The structure of the vehicle front portion as viewed from the front side of the vehicle will be described below.

Figure 5:
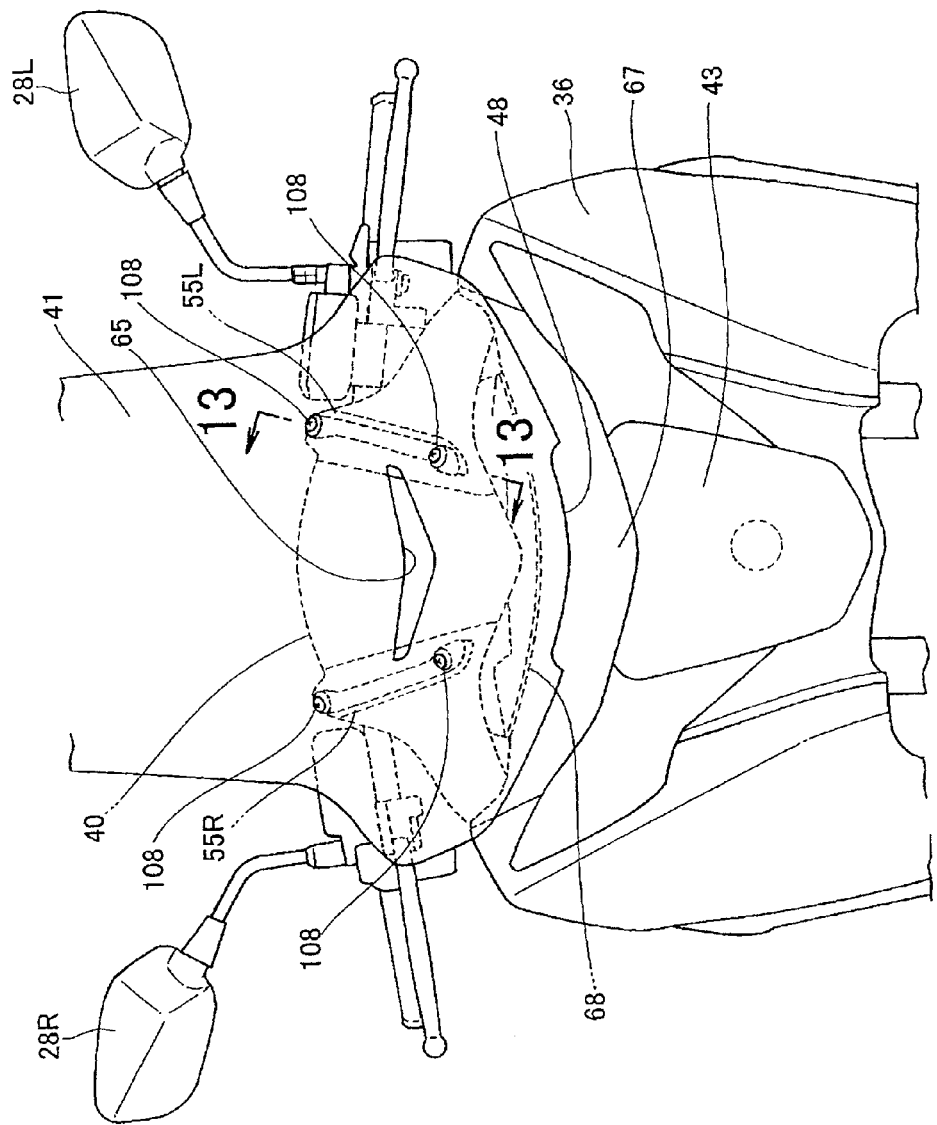
FIG. 5 is a front view of a major part of the motorcycle.

As shown in FIG. 5, the stay brackets 55L and 55R constituting the screen stay front surface and brought into contact with the screen 41 are shaped along the shape of the screen 41. The screen 41 is provided, separately from the flow of air guide section 48 and at such a part as to overlap with the screen stay 40, with an upper-side flow of air guide window 65 for guiding the flow of air to the screen stay 40.

A front cover front surface 67 is provided with a stepped part 68 extending leftward and rightward along the vehicle width direction so as to separate water contained in the flow of air. In FIG. 4, the stepped part 68 is a projection which projects from the front cover front surface 67.

An air duct formed between the front cover and the screen stay, etc. will be described below.

Figure 6:
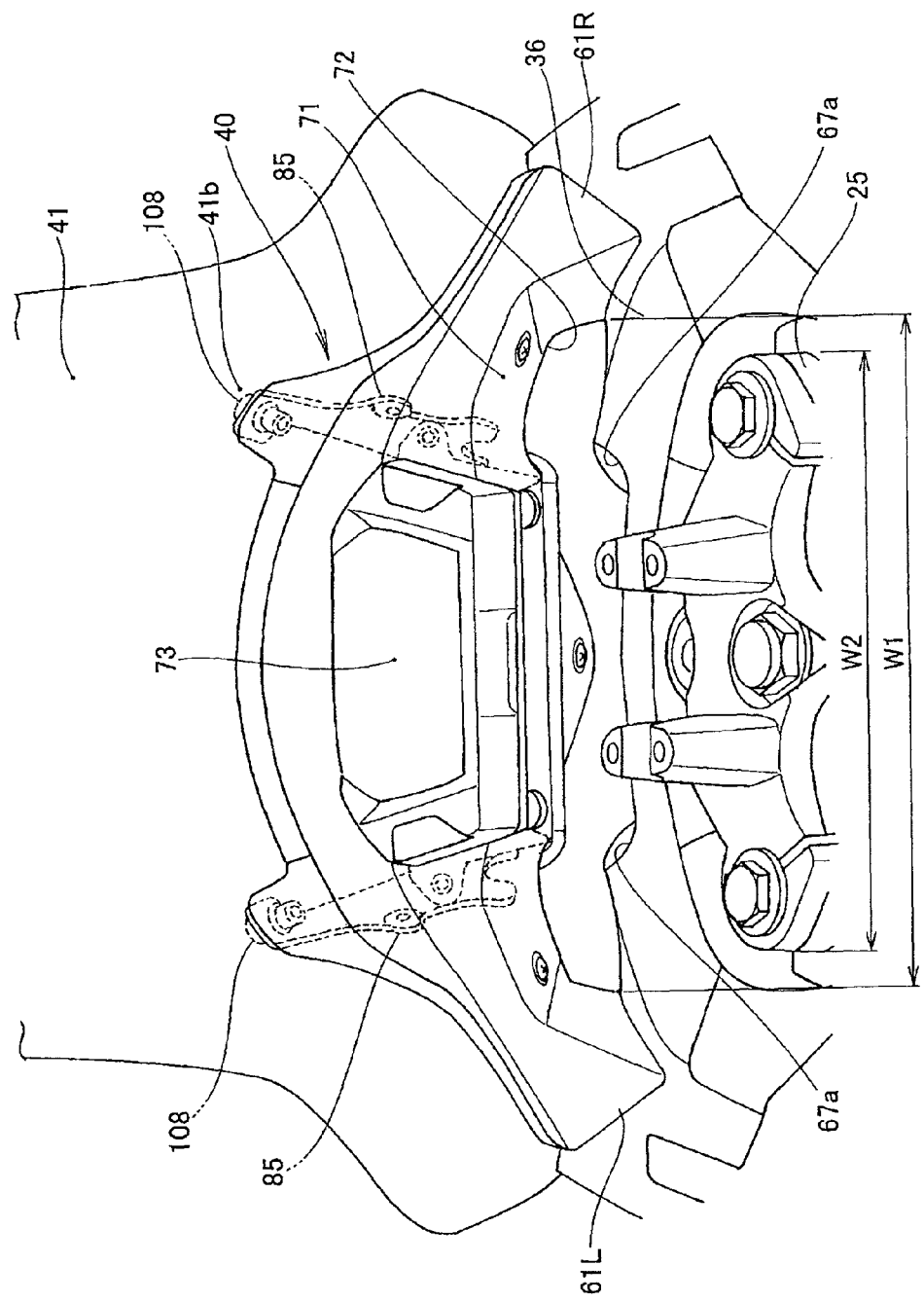
FIG. 6 illustrates a front cover and the screen stay, as viewed from the vehicle rear side of a screen.

As shown in FIG. 6, the screen stay 40 is integrally provided at its lower portion with a bridge-like section 71 spaced upwardly from the front cover 36, and has the left and right connection sections 61L and 61R which extend in the vehicle width direction from the bridge-like section 71 and which are connected to the side of the body frame 11 at positions on the outer sides relative to the fork members 25 in the vehicle width direction.

The above-mentioned configuration ensures that the flow of air guided in via the flow of air guide section (reference symbol 48, in FIG. 5) is permitted to flow through an air duct 72 formed between an upper surface of the front cover 36 and the bridge-like section 71, toward the vehicle rear side.

More specifically, the width W1 of the air duct 72 formed between the upper surface of the front cover 36 and the bridge-like section 71 is greater than the outside width W2 of the fork members 25 (W2<W1). This ensures that a larger quantity of flow of air can be made to flow into the air duct 72 and a larger quantity of flow of air can be taken into the back side of the screen, as compared with the case where the dimensional relation between the width W1 of the air duct 72 and the outside width W2 of the fork members 25 is W1<W2.

A meter 73 for indicating the running conditions of the vehicle is supported on the screen stay 40.

Referring to FIG. 3 as well, the meter 73 for indicating the operating conditions of the vehicle is attached to a lower meter cover 77, which covers the lower side of the meter 73, through elastic bushing 75 and first small screws 76. The lower meter cover 77 is mounted to the screen stay lower half 54 through second small screws 78.

To be more specific, the screen 41 is supported, and the meter 73 is also supported, by the stay body 52 provided as a component element of the screen stay 40. Since the screen stay 40 is made to function also as a support for the meter 73, an increase in the number of component parts can be suppressed.

A recess formed at a rear portion of the front surface of the front cover will be described below.

Figure 7:
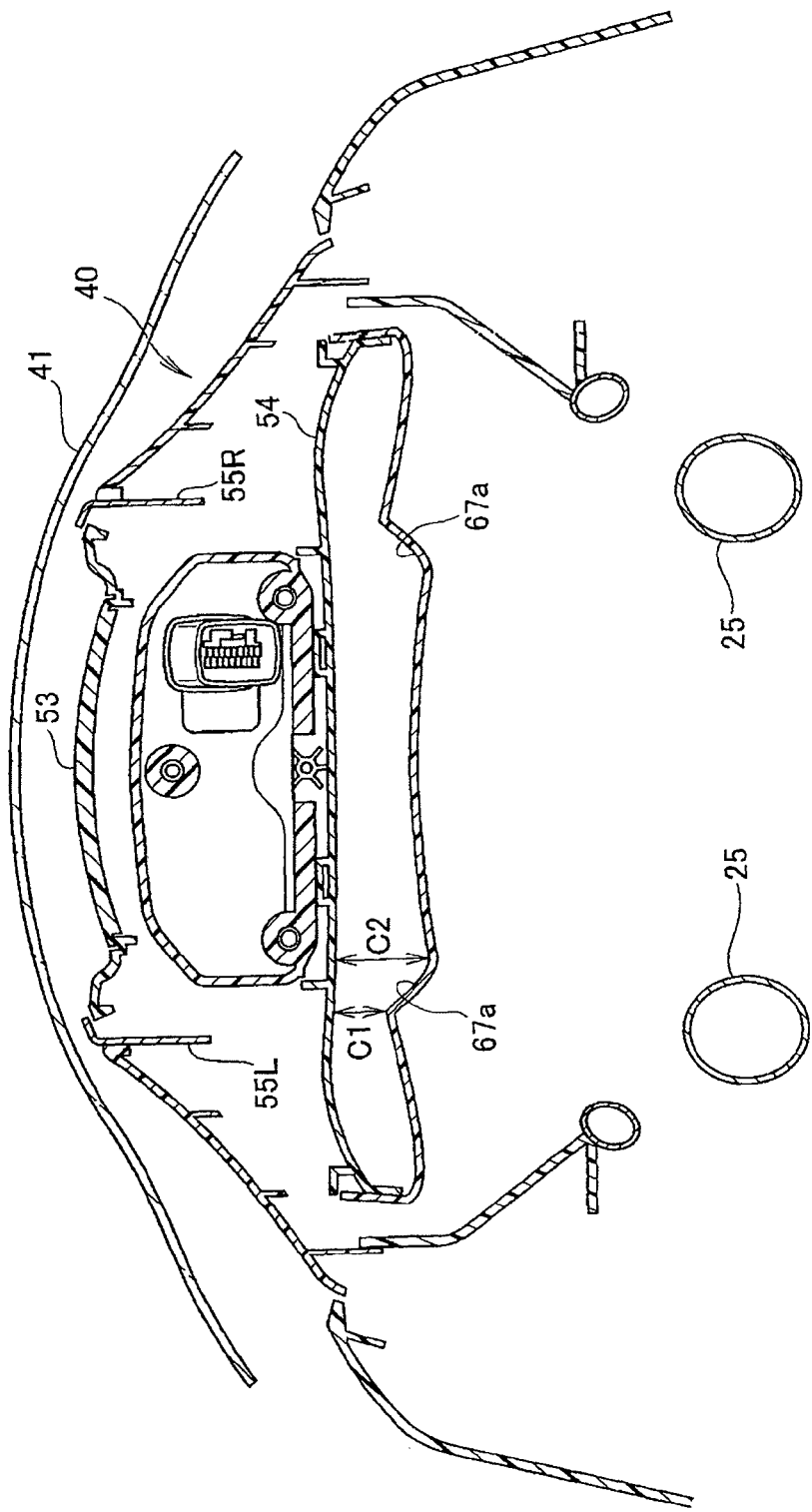
FIG. 7 is a sectional view taken along line 7-7 of FIG. 2.

FIG. 7 shows a section substantially orthogonal to the front surface of the front cover. As shown in FIG. 7, the front cover 36 is provided, at a position facing the screen stay lower half 54, with a recess 67a which is recessed rearward in the vehicle front-rear direction.

In FIG. 7, symbol C1 denotes a minimum part of the clearance between the front cover front surface 67 and the stay body 52 having the screen stay lower half 54 as a component element thereof. On the other hand, symbol C2 denotes a maximum part of the clearance between the front cover front surface 67 and the stay body 52 having the screen stay lower half 54 as a component element thereof.

Referring to FIGS. 8 to 13, a detailed structure of each part of the screen stay and related parts will be described.

A fastening structure between the stay plates and the related parts will be described below. In addition, while the fastening structure on the vehicle left side and the like will be described in the following description, the fastening structure on the vehicle right side and the like are the same as those on the vehicle left side and will therefore be omitted in the following description.

Figure 8:
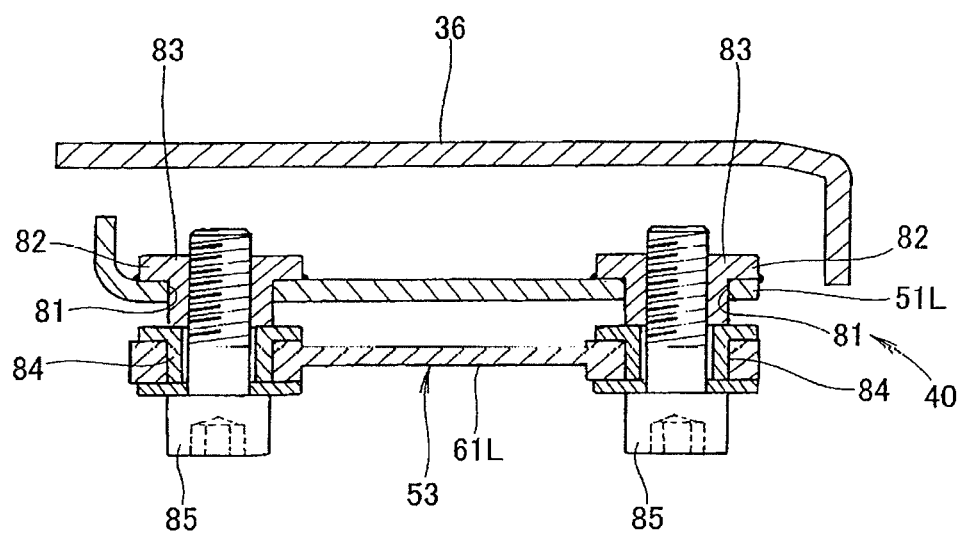
FIG. 8 is a sectional view taken along line 8-8 of FIG. 4.

As shown in FIG. 8, holes 81, 81 are bored in the stay plate 51L extending from the body frame side with weld nuts 83, 83 each provided with a flange section 82 being fixed to the holes 81, 81 from the inner side in the vehicle width direction. The connection section 61L is provided with collars 84, provided as part of the screen stay upper half 53, extending downwardly from the screen stay upper half 53 and aligned to the weld nuts 83, 83. The screen stay upper half 53 is mounted to the stay plate 51L from the vehicle outer side by first screws 85, 85.

The front cover 36 is disposed on the inner side of the screen stay 40 in the vehicle width direction.

A fastening structure between bracket support sections extending downwardly from the screen stay upper half and the stay bracket will be described below.

Figure 9:
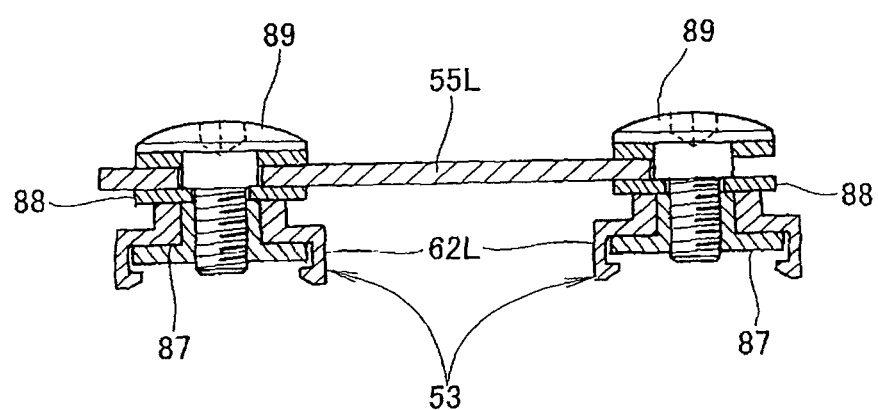
FIG. 9 is a sectional view taken along line 9-9 of FIG. 4.

As shown in FIG. 9, connection nuts 87, 87 are engaged with the bracket support sections 62L, which extend from the screen stay upper half 53, from the outer side in the vehicle width direction. Washers 88, 88 are brought into contact with the bracket support sections 62L from the inner side in the vehicle width direction. The stay bracket 55L is aligned thereto from the inner side in the vehicle width direction with second screws 89, 89 engaged into the connection nuts 87, 87, whereby the stay bracket 55L is attached to the bracket support sections 62L.

Figure 10:
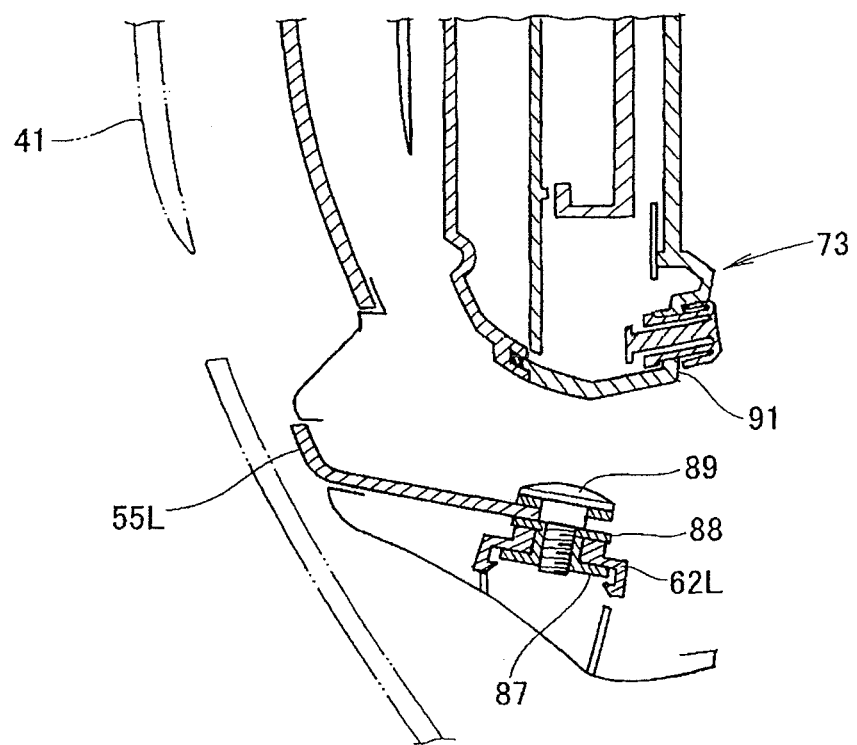
FIG. 10 is a sectional view taken along line 10-10 of FIG. 4.

As shown in FIG. 10, the meter 73 covered with a meter case 91 is disposed on the inner side of the stay bracket 55L in the vehicle width direction. In addition, the screen 41 is disposed on the vehicle front side of the stay bracket 55L.

A fastening structure between the lower meter cover and the meter will be described below.

Figure 11:
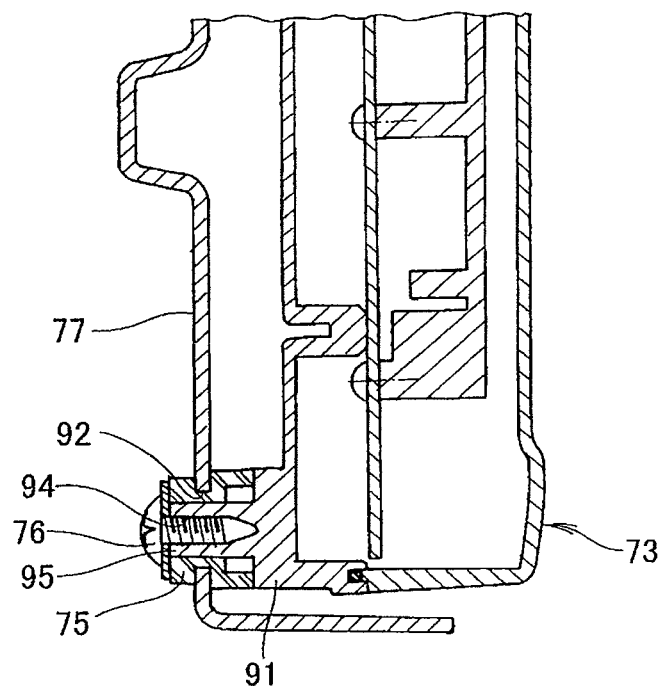
FIG. 11 is a sectional view taken along line 11-11 of FIG. 4.

As shown in FIG. 11, the lower meter cover 77 is provided with a hole section 92, and an elastic bushing 75 is fitted into the hole section 92. A cylindrical projection 95 projected from the meter case 91 is fitted into a hole 94 of the bushing from the vehicle rear side, and the first small screw 76 is screw-engaged with the projection 95 from the vehicle front side, whereby the meter 73 is attached to the lower meter cover 77. Since the elastic bushing 75 is interposed between the lower meter cover 77 and the meter 73, vibrations on the vehicle body side can be prevented from being easily transmitted to the meter 73.

A fastening structure between the lower meter cover and the screen stay lower half will be described below.

Figure 12:
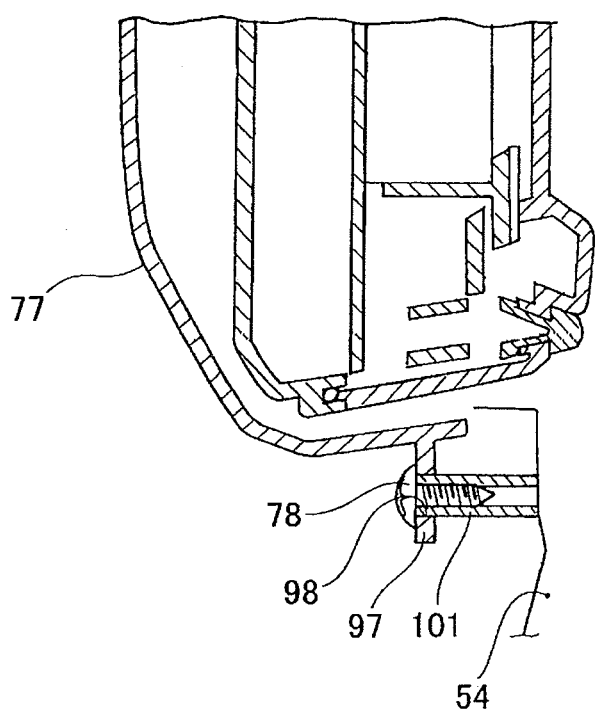
FIG. 12 is a sectional view taken along line 12-12 of FIG. 4.

As shown in FIG. 12, the lower meter cover 77 is provided with a flange 97, and the flange 97 is formed with a positioning hole 98. The positioning hole 98 is fitted to a boss section 101 provided as part of the screen stay lower half 54, and the second small screw 78 is screw-engaged into the boss section 101, whereby the lower meter cover 77 is mounted to the screen stay lower half 54.

A fastening structure between the stay bracket and the screen will be described below.

Figure 13:
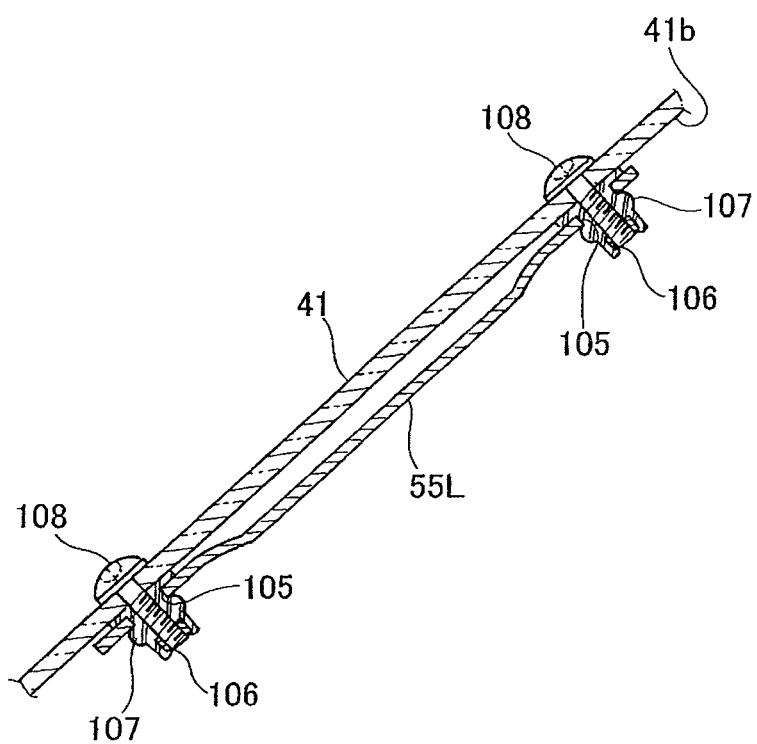
FIG. 13 is a sectional view taken along line 13-13 of FIG. 5.

As shown in FIG. 13, collar members 107, 107 each provided with a nut 106 are fitted into mounting holes 105, 105 bored in the stay bracket 55L. Subsequently, the screen 41 is brought into contact with the collar members 107, 107, and the third screws 108 are screw-engaged into the nuts 106, whereby the screen 41 is attached to the stay bracket 55L.

The operation of the front structure for the saddle-type vehicle as above-described will be described below.

Referring to FIGS. 4 and 6, the bridge-like section 71 formed by the screen stay 40 is provided on the upper side of the front cover 36.

A screen rear surface 41b is attached to the screen stay 40 in such a manner that the flow of air guide section 48 permitting the flow of air to get therein is formed between the screen lower edge 41k and the front cover 36.

Figure 14:
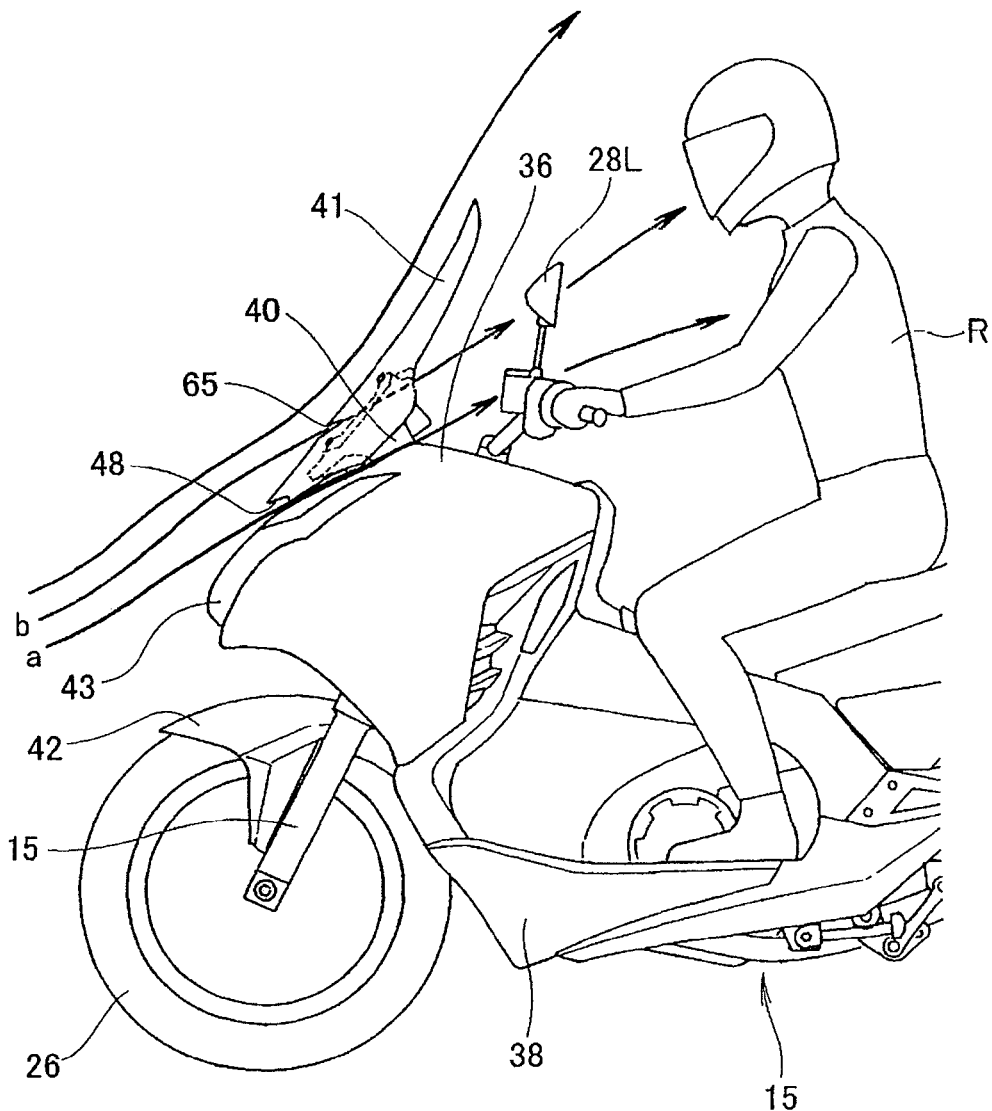
FIG. 14 is an illustration of operation of a front portion of the vehicle.

As shown in FIG. 14, the flow of air guided into the flow of air guide section (reference symbol 48, in FIG. 4) flows in the direction of arrow a between the front cover 36 and the bridge-like section (reference symbol 71, in FIG. 6) toward the vehicle rear side.

Since the flow of air is supplied to the back side of the screen 41, a negative-pressure condition on the back side of the screen 41 is moderated or eliminated, so that the flow of air flowing near edges of the screen 41 would not easily come around to the back side of the screen 41. As a result, a disturbance of the flow of air is restrained.

In addition, the flow of air guided into the flow of air guide section 48 flows toward the rider R located on the vehicle rear side of the flow of air guide section 48.

Hitherto, even a structure designed to guide a flow of air to the rear side of a screen has not been designed taking into account a condition for causing the flow of air to flow toward the rider. In such a structure, the heat of the engine may be transferred to the rider, so that there is room for improvement in regard of comfortableness during operation of the vehicle.

In connection with this point, in the present invention, it is ensured that the flow of air guided in via the flow of air guide section 48 flows between the upper edge of the front cover 36 and the bridge-like section 71 toward the vehicle rear side. Since the flow of air guided to the rear surface 41b of the screen flows through the air duct 72 toward the rider, the rider can be cooled with this flow of air.

Therefore, according to the present invention, thermal influence on the rider can be alleviated, whereby comfortability during operating the vehicle can be enhanced.

In addition to the air duct 72, the screen is provided with the upper-side flow of air guide window 65 at such a part as to overlap with the screen stay 40 in front view of the vehicle.

A portion of the flow of air entering between the screen stay 40 and the screen 41 flows, as indicated by arrow b in FIG. 14, through the upper-side flow of air guide window 65 to the rear surface 41b constituting the back surface of the screen. Since the flow of air flows to the screen rear surface 41b, dewing on the screen rear surface 41b can be restrained.

Referring to FIG. 4 as well, the front surface 67 of the front cover is provided with the stepped part 68 extending to the left and right along the vehicle width direction. In the case where the flow of air containing water flows along the front cover front surface 67, the flow of air comes into contact with the stepped part 68, upon which a portion of the water contained in the flow of air, is separated. Since a portion of the water is removed by the stepped part 68, the quantity of water contained in the flow of air flowing along the front cover front surface 67 toward the vehicle rear side can be reduced.

Returning to FIG. 7, the front surface 67 of the front cover is provided at its rear portion with the recess 67a recessed to the rear in the vehicle front-rear direction. With such a recess 67a provided at the rear portion of the front cover front surface 67, an exit for the flow of air guided to the back side of the screen 41 can be enlarged, whereby a larger quantity of the flow of air thus guided can be made to flow toward the rider.

In addition, while the present invention has been applied to the motorcycle in the embodiment described above, the invention can be applied also to three-wheel vehicles, and may be applied to general saddle-type vehicles.

The present invention is suitable for application to motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front structure for a saddle-type vehicle comprising:
   a fork member supported on a head pipe provided at a front portion of a body frame with a front wheel being rotatably supported thereon;
   a front cover disposed on an upper side of the fork member; and
   a screen stay disposed on an upper side of the front cover to support the screen; and
   a flow of air guide section being formed at a lower edge of the screen for guiding a flow of air in so that the flow of air flows to the back side of the screen;
   wherein the screen stay includes a stay screen upper half integrally provided with a bridge-like section spaced upwardly from the front cover, the stay screen upper half of the screen stay having left and right connection sections curving downwardly and extending in a vehicle width direction from the bridge-like section and connected respectively to left and right stay plates extending upwardly from left and right stay bases of the body frame at positions on outer sides relative to the fork member in the vehicle width direction,
   said flow of air guided in via the flow of an air guide section is permitted to flow between an upper edge of the front cover and the bridge-like section toward a vehicle rear side.

2. The front structure for the saddle-type vehicle according to claim 1, wherein the screen stay includes a stay screen lower half abutted on and connected to the screen stay upper half from a lower side of the screen stay upper half, and
   a meter for indicating operating conditions of the vehicle is supported on the screen stay lower half.

3. The front structure for the saddle-type vehicle according to claim 1,
   wherein a front surface of the screen stay is faulted along the shape of the screen, and
   the screen is provided, separately from the flow of air guide section and at such a part for overlapping with the screen stay, with an air guide window for guiding an upper-side flow of air to the front surface of the screen stay.

4. The front structure for the saddle-type vehicle according to claim 2,
   wherein a front surface of the screen stay is formed along the shape of the screen, and
   the screen is provided, separately from the flow of air guide section and at such a part for overlapping with the screen stay, with an air guide window for guiding an upper-side flow of air to the front surface of the screen stay.

5. The front structure for the saddle-type vehicle according to claim 1, wherein the front cover is provided at its front surface with a stepped part extending to a left and a right direction along the vehicle width direction for separating water contained in the flow of air.

6. The front structure for the saddle-type vehicle according to claim 2, wherein the front cover is provided at its front surface with a stepped part extending to a left and a right direction along the vehicle width direction for separating water contained in the flow of air.

7. The front structure for the saddle-type vehicle according to claim 1, wherein the front cover is provided at its front surface with a stepped part for separating water contained in the flow of air, wherein the stepped part protrudes upwardly from the front surface of the front cover and extends left-right in a vehicle width direction.

8. The front structure for the saddle-type vehicle according to claim 1, wherein the front cover is provided at a rear portion of its front surface with a recess recessed rearward in a vehicle front-rear direction.

9. The front structure for the saddle-type vehicle according to claim 2, wherein the front cover is provided at a rear portion of its front surface with a recess recessed rearward in a vehicle front-rear direction.

10. The front structure for the saddle-type vehicle according to claim 3, wherein the front cover is provided at a rear portion of its front surface with a recess recessed rearward in a vehicle front-rear direction, the recess providing an enlarged exit for the flow of air guided between screen stay and the front cover, whereby a larger quantity of the flow of air thus guided is made to flow toward the rider.

11. A front structure adapted for use with a saddle-type vehicle comprising:
    a front cover adapted to be disposed on an upper side of a fork member; and
    a screen stay disposed on an upper side of the front cover to support the screen; and
    a flow of air guide section being formed at a lower edge of the screen for guiding a flow of air in so that the flow of air flows to the back side of the screen;
    wherein the screen stay includes a stay screen upper half integrally provided with a bridge-like section spaced upwardly from the front cover, stay screen upper half of the stay screen having left and right connection sections curving downwardly and extending in a vehicle width direction from the bridge-like section and connected respectively to left and right stay plates extending upwardly from left and right stay bases of the body frame at positions on outer sides relative to the fork member in the vehicle width direction,
    said flow of air guided in via the flow of an air guide section is permitted to flow between an upper edge of the front cover and the bridge-like section toward a vehicle rear side.

12. The front structure adapted for use with the saddle-type vehicle according to claim 11, wherein the screen stay includes a stay screen lower half abutted on and connected to the screen stay upper half from a lower side of the screen stay upper half, and
    a meter for indicating operating conditions of the vehicle is supported on the screen stay lower half.

13. The front structure adapted for use with the saddle-type vehicle according to claim 11,
    wherein a front surface of the screen stay is formed along the shape of the screen, and
    the screen is provided, separately from the flow of air guide section and at such a part for overlapping with the screen stay, with air guide window for guiding an upper-side flow of air to the front surface of the screen stay.

14. The front structure adapted for use with the saddle-type vehicle according to claim 12,
    wherein a front surface of the screen stay is formed along the shape of the screen, and
    the screen is provided, separately from the flow of air guide section and at such a part for overlapping with the screen stay, with an air guide window for guiding an upper-side flow of air to the front surface of the screen stay.

15. The front structure adapted for use with the saddle-type vehicle according to claim 11, wherein the front cover is provided at its front surface with a stepped part extending to a left and a right direction along the vehicle width direction for separating water contained in the flow of air.

16. The front structure for adapted for use with the saddle-type vehicle according to claim 12, wherein the front cover is provided at its front surface with a stepped part extending to a left and a right direction along the vehicle width direction for separating water contained in the flow of air.

17. The front structure adapted for use with the saddle-type vehicle according to claim 11, wherein the front cover is provided at its front surface with a stepped part for separating water contained in the flow of air, wherein the stepped part protrudes upwardly from the front surface of the front cover and extends left-right in a vehicle width direction.

18. The front structure adapted for use with the saddle-type vehicle according to claim 11, wherein the front cover is provided at a rear portion of its front surface with a recess recessed rearward in a vehicle front-rear direction.

19. The front structure adapted for use with the saddle-type vehicle according to claim 12, wherein the front cover is provided at a rear portion of its front surface with a recess recessed rearward in a vehicle front-rear direction.

20. The front structure adapted for use with the saddle-type vehicle according to claim 11, wherein the front cover is provided at a rear portion of its front surface with a recess recessed rearward in a vehicle front-rear direction, the recess providing an enlarged exit for the flow of air guided between screen stay and the front cover, whereby a larger quantity of the flow of air thus guided is made to flow toward the rider.

* * * * *